United States Patent
Kirchhoff et al.

[11] Patent Number: 5,924,773
[45] Date of Patent: Jul. 20, 1999

[54] SAFETY BELT FASTENING ARRANGEMENT

[75] Inventors: Heiko Kirchhoff; Erich Dilger; Karl-Dieter Lorenz, all of Wolfsburg; Jakob Schweissgut, Leiferde, all of Germany

[73] Assignee: Volkswagen AG, Wolfsburg, Germany

[21] Appl. No.: 08/893,845

[22] Filed: Jul. 11, 1997

[30] Foreign Application Priority Data

Jul. 11, 1996 [DE] Germany .......................... 196 27 914

[51] Int. Cl.⁶ ............................................. A47C 41/00
[52] U.S. Cl. ......................... 297/473; 297/471; 280/806
[58] Field of Search ................................ 297/473, 471; 280/804, 806

[56] References Cited

U.S. PATENT DOCUMENTS

| 4,260,178 | 4/1981 | Klutting ......................... 297/473 X |
| 4,923,214 | 5/1990 | Siegrust et al. .................. 297/473 X |
| 5,064,220 | 11/1991 | Ogawa ............................ 280/806 X |

FOREIGN PATENT DOCUMENTS

| 2471793 | 6/1981 | France . |
| 2742668 | 3/1979 | Germany . |
| 2802617 | 7/1979 | Germany .............................. 297/473 |
| 3829824 | 3/1989 | Germany . |

*Primary Examiner*—Laurie K. Cranmer
*Attorney, Agent, or Firm*—Baker & Botts, L.L.P.

[57] ABSTRACT

A safety belt fastening arrangement for an adjustable vehicle seat includes a latching element which can be latched in a latching rail affixed to the vehicle and which has a retaining part to receive, for example, a belt buckle for the safety belt. In its normal position, a deformation element assures that the latching element is kept out of engagement with the latching rail. When a predetermined safety-belt force is exceeded, the deformation element yields to permit the latching element to engage the latching rail so that the safety belt forces are transmitted directly into the vehicle body. The latching element is arranged behind a pivot point for the latching element toward the rear of the vehicle seat, permitting extremely short lever arms and very small clearances during the controlled engagement of the latching element with the latching rail. The deformation element is elastic and is retained in a retaining pocket fixed to the vehicle seat. The individual parts of the latching arrangement may be combined to form a subassembly.

18 Claims, 2 Drawing Sheets

SAFETY BELT FASTENING ARRANGEMENT

BACKGROUND OF THE INVENTION

This invention relates to arrangements for fastening vehicle safety belts having a latching element engageable with a latching rail affixed to the vehicle.

German Patent No. 38 29 824 and German Offenlegungsschrift No. 27 42 668 disclose vehicle seats having safety belts in which a belt is fastened at least indirectly to the vehicle seat by a latching arrangement. When a predetermined belt force is exceeded, the latching elements are moved out of their rest position into engagement with a latching rail which is fixed to the vehicle body. Such arrangements have the advantage that the force which is applied to the belt during a restraining action is transmitted directly into the vehicle body and does not have to be absorbed by the vehicle seat itself. Accordingly, the vehicle seat may be designed with considerably smaller dimensions and thus, in particular, may be produced by a lightweight construction method. A further advantage of this arrangement is that belt buckles which are fastened on the vehicle seat are always moved along with the seat when the seat is adjusted, thus ensuring the optimum restraint position with respect to the vehicle occupant in each case. A further advantage which should be mentioned, with reference to German Patent No. 38 29 824, is that the retaining part for the belt buckle is always in a predetermined angular position, and thus always provides clear orientation for the vehicle occupant when inserting the seat-belt tongue.

SUMMARY OF THE INVENTION

Accordingly, it is an object of the present invention to provide a safety belt fastening arrangement which overcomes disadvantages of the prior art.

Another object of the invention is to provide a safety belt arrangement of optimum design, especially with respect to its capacity for mass production and/or to improve the kinematics of the latching element during a restraining action.

These and other objects of the invention are attained in one embodiment by providing a retaining part for a seat belt component, a latching rail fixed to the vehicle, and a latch element engageable with the latching rail and supported by a pivotable member which is arranged so that the latch element is disposed rearwardly of the pivot point of the pivotable member. Thus, the latching element is oriented toward the rear of the vehicle seat. In a preferred embodiment, the pivot point is in a bearing block which is located relatively closely in front of a rear seat leg. Consequently, the latching element is located between the pivot point and the rear of the seat. Such an arrangement can be used to provide a very short pivot lever even for belt buckles which are arranged relatively far to the rear, one end of the pivot lever being mounted at the pivot point and the other end having a recess for receiving the latching element or itself being the support for the latching element. The very short pivot lever and, in particular, the positioning of the latching element between the pivot point and rear leg, provides a design which ensures that the belt force acting on the retaining part during a restraining action acts approximately in the direction of motion of the latching element. This results in directly controlled engagement of the latching element into the latching rail without transmission losses. In addition, the very short lever arm ensures that it is not possible for any excessively large deflection to take place at the pivot lever due to the dead weight of the retaining part if an elastic deformation element is provided in the connection between the pivot lever and the pivot point as described hereinafter. In this manner, it is possible to select the distance between the latching element and the latching rail in the rest position to be very small. Consequently, when a load is applied to the seat belt, only an extremely small clearance has to be bridged.

In another embodiment of the invention, an elastic deformation element is retained in a retaining lug fixed to the vehicle seat. The pivot point for the latching element is also located in the retaining lug and the latching element is controlled by a pivot lever which is operatively connected to the deformation element. In a particularly advantageous arrangement, the deformation element is an elastic rubber buffer which is formed in the manner of a polygonal torus and is produced from a rubber material. The polygon, which is preferably a square, has its outer contour dimensioned such that it can be closely fitted into a correspondingly contoured retaining pocket and can also receive a square bearing element for the pivot lever in its inner contour. With this arrangement, all that is required for the controlled engagement of the latching element, which is preferably in the form of a cam, with the latch rail is the assembly of a few small parts, which can be produced inexpensively as mass-produced products. The use in this embodiment of the short lever described above thus permits a weight-saving construction because the individual elements of the arrangement as a whole may be very small, especially in conjunction with the controlled engagement of the latching element.

A further advantage of the controlled engagement of the latching element into the latching rail, for example after full braking, is that the engagement is canceled as soon as the belt force decreases. The retaining part for the belt buckle is thus returned to its initial position again. Moreover, it is possible to dispense with the rubber buffers provided in the guide rail in conventional seats. This reduces the force required for longitudinal adjustment of the front seat and enhances comfort and convenience. The arrangement according to a third embodiment of the invention is of particular importance for the assembly of the safety belt fastening. In this embodiment, the deformation element acts as a pivot bearing for the pivot lever and is combined with at least the pivot lever to form a subassembly. In this case, for captive fastening of the deformation element, the deformation element may be formed by vulcanization, for example, on the pivot lever itself or on an installation part associated with the pivot lever.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
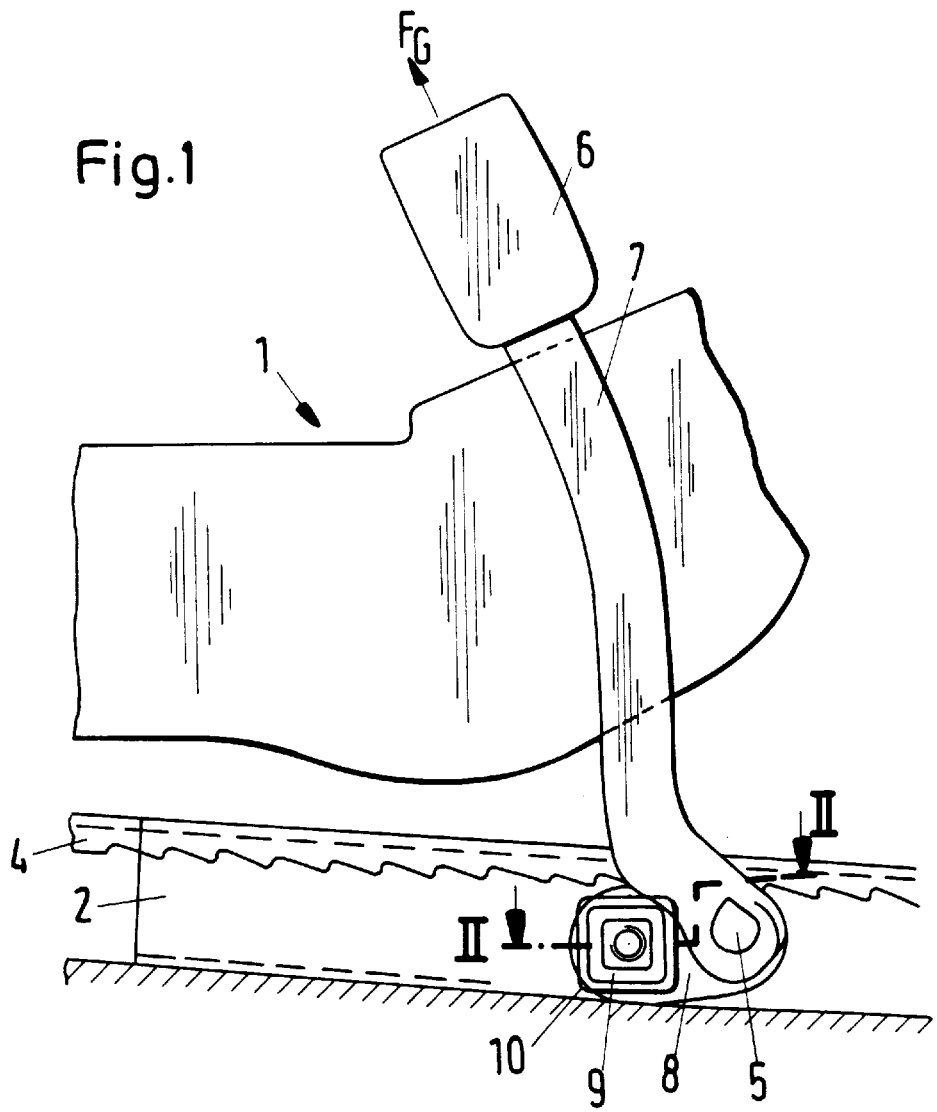
FIG. 1 is a fragmentary side view of a safety belt fastening arrangement according to a representative embodiment of the invention.

The same components have the same reference numerals in all the figures.

Figure 2:
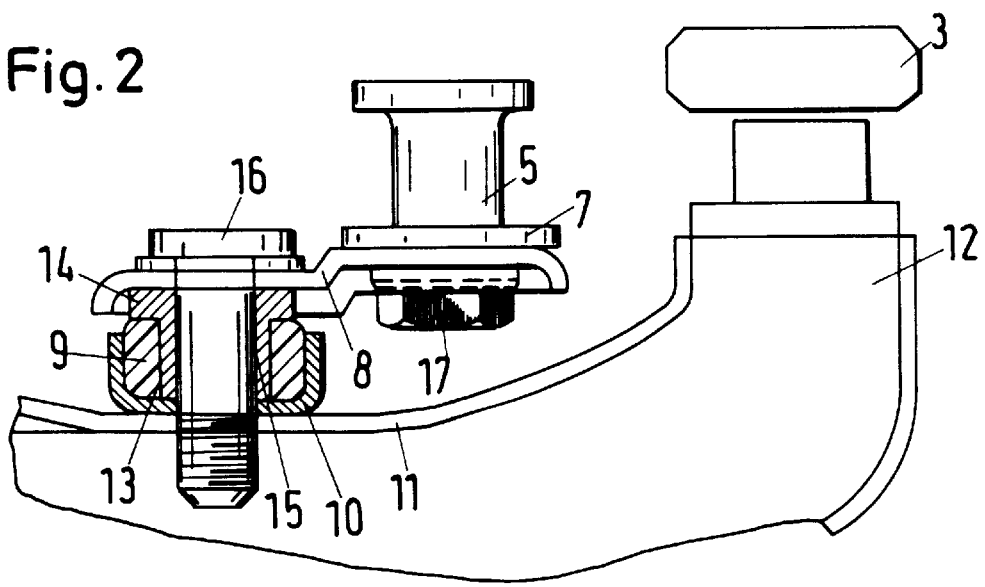
FIG. 2 is a sectional view taken along the line II—II of FIG. 1 and looking in the direction of the arrows.
Figure 3:
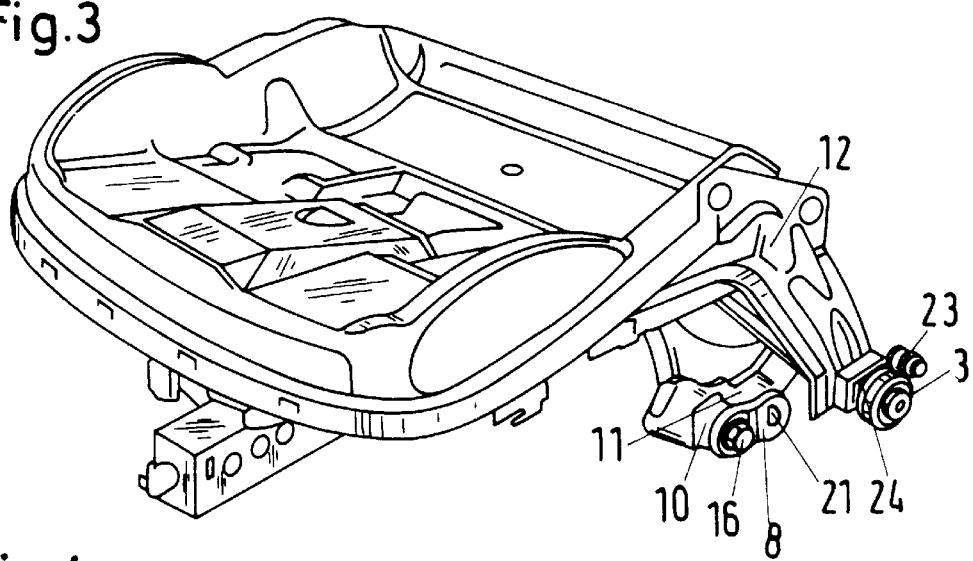
FIG. 3 is a perspective view of a representative vehicle-seat framework on which the safety belt fastening -arrangement shown in FIG. 1 is mounted.
Figure 6:
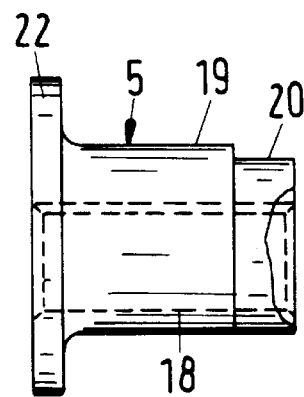
FIGS. 6 and 7 are views illustrating a typical latching element.
Figure 5:
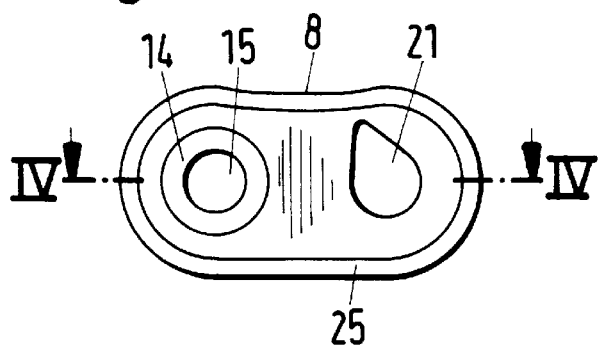
Figure 7:
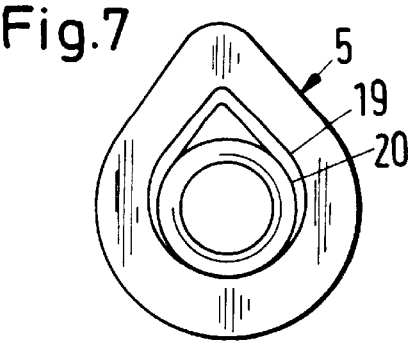
Figure 8:
FIGS. 8 and 9 are views illustrating an elastic deformation element.
Figure 9:
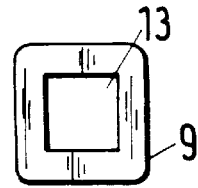

A vehicle seat 1, a portion of which is shown in FIG. 1, is supported for longitudinal motion along a guide rail 2 by a roller 3, shown in FIGS. 2 and 3, or by means of a similarly conventional sliding block. An integral constituent part of the guide rail 2 is a latching rail 4, which in this case is formed in a saw-tooth-like manner. A latching element 5, which in the illustrated embodiment has the form of a cam, can be moved into the latching rail 4 in the event of full braking or of an accident in which the force acting on a belt buckle 6, which is fastened to a retaining part 7, exceeds a predetermined belt force $F_G$. Further important constituent parts of the seat belt fastening arrangement according to the invention are a pivot lever 8, a deformation element 9 and a retaining pocket 10 for the deformation element 9 as shown in FIG. 2. The retaining pocket is mounted on a bearing block 11, which is associated with a rear seat leg 12, and, in this case, is designed as an integral constituent part thereof. The retaining pocket 10, which has a polygonal inner profile, and in this case is a square cup, is fastened on the bearing block by $CO_2$ welding or by projection welding, for example. The square cup 10 receives the correspondingly profiled deformation element 9 as shown in FIG. 2. Fitted into a second polygon profile 13, which in this case is a square recess, is a bearing sleeve 14, which also has the form of a square and is fixedly connected in the manner of an engagement piece to the pivot lever 8 and has a through-passage interval bore 15 through which a mounting screw 16 passes. A further mounting screw 17 is received in an internal thread 18 of the latching element 5 as shown in FIG. 6. The latching element 5 has a first cam engagement section 19, which can be arrested in the latching rail 4, and a second cam engagement section 20 which is smaller than the first section and is fitted into a correspondingly contoured recess 21 of the pivot lever 8, shown in FIG. 5, in a positively locking manner. A peripheral retaining flange 22, shown in FIGS. 6 and 7, prevents lateral removal of the cam from the latching rail 2 which is attached to the vehicle. The retaining part 7 is also prevented in the same way from tilting with respect to the pivot lever 8.

It can also be seen from FIG. 3 that, in accordance with one aspect of the invention, the latching element 5, which can be inserted into the recess 21, is arranged between a rear seat leg 12 and a pivot point located within the retaining pocket 10. In this case, the safety belt retaining part 7 is designed such that, in a typical loading case, the belt force $F_G$ is directed so that its line of action runs essentially through the latching element 5 as shown in FIG. 1. Because of the extremely short pivot lever 8, there are no transmission losses when the latching element 5 is moved upwardly in the direction of the latching rail 4 by compression of the deformation element 9. If the deformation element 9 is made, for example, from rubber, the latching element 5 is automatically moved out of engagement with the latching rail 4 when the belt loading decreases. This restores it to its normal position, which permits trouble-free longitudinal adjustment of the vehicle seat 1 within the guide rail 2.

In the typical embodiment shown in FIG. 3, the roller 3 is also provided with a pressure exerting roller 23, which is similarly mounted in a second retaining pocket 24 along with a deformation element (not shown). According to a particularly advantageous arrangement of the invention, this further deformation element as well as the retaining pocket 24 may be designed in the same manner as the retaining pocket 10 and the deformation element 9, with the result that identical individual parts for the two functions can be produced inexpensively.

The mounting of the pivot lever 8 by use of the elastic deformation element 9 is an important aspect of the invention. A particular advantage in this case is to be seen in the fact that, using easily producible small parts, it is possible to provide a pivot point for the latching element 5 without a high degree of assembly expense.

In this regard, it is also of particular importance that it is possible to form a subassembly from at least the deformation element 9, the bearing sleeve 14 and the pivot lever 8. However, in order to simplify matters further, the latching element 5 and the retaining part 7 together with the belt buckle 6 may also be included in the subassembly. This relatively large number of components is then screwed in its entirety to the bearing block 11 and/or the seat leg 12.

The combination comprising the retaining pocket 10, bearing sleeve 14 and deformation element 9 may also be made as a subassembly. It is possible for the deformation element 9 to be vulcanized in place in the subassembly so that it fixedly joins the components with which it cooperates to each other. The retaining pocket 10 can then be mounted on the bearing block 11 by a fastening screw 16. The pivot lever 8 is fastened on the bearing sleeve 14 so that it is free to move.

Figure 4:
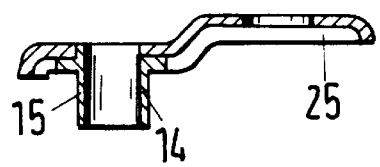
FIGS. 4 and 5 are views illustrating a typical pivot lever.

In order to provide sufficient stability, the pivot lever 8 has a peripheral retaining flange 25 which has rounded surface where it joins the bottom region of the lever as shown in FIG. 4 and can thus be handled by assemblers without posing a risk of injury.

Although the invention has been described herein with reference to specific embodiments, many modifications and variations therein will readily occur to those skilled in the art. For example, the seat legs and seat guiding arrangement may have any desired configuration. Furthermore, the retaining pocket 10 may be affixed directly to the seat leg 12. Moreover, a kinematic reversal of the fastening of the latching element 5 is also possible. For example, the latching element may be fastened on the pivot lever 8 and engage a correspondingly contoured recess of the retaining part 7. Accordingly, all such variations and modifications are included within the intended scope of the invention.

We claim:

1. A safety belt fastening arrangement for an adjustable vehicle seat comprising:

an adjustable vehicle seat having rear legs adjustable positioned in a latching rail affixed to the vehicle;

a retaining part receiving a component of a safety belt and arranged to actuate a latching element;

the latching element arranged to be latched in the latching rail and being pivotally supported at a pivot point with respect to the vehicle seat and located between the pivot point and the rear legs;

a deformation element which is elastically deformable in response to application of a belt force to the retaining part, the deformation element normally maintaining the latching element out of engagement with the latching rail and, when a force greater than a predetermined force is applied to the belt, yields so as to cause the latching element to latch in the latching rail;

wherein the latching element is arranged rearwardly of the latching element pivot point, so as to be displaced therefrom toward the rear of the vehicle seat.

2. A safety belt fastening arrangement for an adjustable vehicle seat comprising:

a retaining part receiving a component of a safety belt and arranged to actuate a latching element;

the latching element arranged to be latched in a latching rail and being pivotally supported with respect to the vehicle seat;

a deformation element which is elastically deformable in response to application of a belt force to the retaining part, the deformation element normally maintaining the latching element out of engagement with the latching rail and, when a force greater than a predetermined force is applied to the belt, yields so as to cause the latching element to latch in the latching rail;

wherein the elastic deformation element is retained in a retaining pocket fixed to the vehicle seat; and wherein a pivot point for the latching element is located within the retaining pocket, and a pivot lever which serves to control the latching element and is articulated in the region of the pivot point is operatively connected to the deformation element.

3. A safety belt fastening arrangement for an adjustable vehicle seat comprising:

a retaining part receiving a component of a safety belt and arranged to actuate a latching element;

the latching element arranged to be latched in a latching rail affixed to the vehicle and being pivotally supported with respect to the vehicle seat;

a deformation element which is elastically deformable in response to application of a belt force to the retaining part, the deformation element normally maintaining the latching element out of engagement with the latching rail and, when a force greater than a predetermined force is applied to the belt, yielding so as to cause the latching element to latch in the latching rail;

wherein the deformation element, a bearing sleeve at the pivot point, and a pivot lever retaining the bearing sleeve are combined in a subassembly.

4. A safety belt fastening arrangement according to any one of claims 1–3 wherein the latching element is in the form of a cam.

5. A safety belt fastening arrangement according to claim 4 wherein the latching element has a first cam engagement section to engage the latching rail and a second cam engagement section with a recess which receives the latching element in a positively locating manner.

6. A safety belt fastening arrangement according to claim 4 wherein the latching element has a threaded bore.

7. A safety belt fastening arrangement according to claim 4 wherein the latching element has an integrally formed peripheral retaining flange with a cam contour.

8. A safety belt fastening arrangement according to any one of claims 1–3 wherein the latching element is mounted on the retaining part.

9. A safety belt fastening arrangement according to claim 2 or claim 3 wherein the latching element is mounted on the pivot lever.

10. A safety belt fastening arrangement according to claim 9 wherein a recess which receives the latching element in a positively locking manner is provided on the retaining part.

11. A safety belt fastening arrangement according to claim 2 or claim 3 wherein a recess which receives the latching element in a positively locking manner is provided on the pivot lever.

12. A safety belt fastening arrangement according to claim 1 or claim 3 wherein:

at least an inner wall of a retaining pocket has a first polygonal profile;

the deformation element has an outer contour corresponding to the first polygonal profile and is received in the retaining pocket in a positively locking manner;

a second polygonal profile is provided as a pivot bearing within the deformation element; and a correspondingly contoured engagement piece which is connected to the pivot lever is received in the second polygonal profile.

13. A safety belt fastening arrangement according to claim 2 or claim 3 wherein the pivot lever is a shaped sheet metal part with a flange around the periphery of the pivot lever having a rounded surface where the flange joins the body of the lever.

14. A safety belt fastening arrangement according to claim 13 wherein the shaped sheet-metal part has punched recesses to receive at least one of the latching element and a pivot point element in a positively locking manner.

15. A safety belt fastening arrangement according to claim 2 wherein:

at least an inner wall of the retaining pocket has a first polygonal profile;

the deformation element has an outer contour corresponding to the first polygonal profile and is received in the retaining pocket in a positively locking manner;

a second polygonal profile is provided as a pivot bearing within the deformation element; and a correspondingly contoured engagement piece which is connected to the pivot lever is received in the second polygonal profile.

16. A safety belt fastening arrangement according to claim 1 wherein the latching element is mounted on a pivot lever.

17. A safety belt fastening arrangement according to claim 1 wherein a recess which receives the latching element in a positively locking manner is provided on a pivot lever.

18. A safety belt fastening arrangement according to claim 1 including a pivot lever which is a shaped sheet metal part with a flange around the periphery of the pivot lever having a rounded surface where the flange joins the body of the lever.

\* \* \* \* \*